Figure 1:
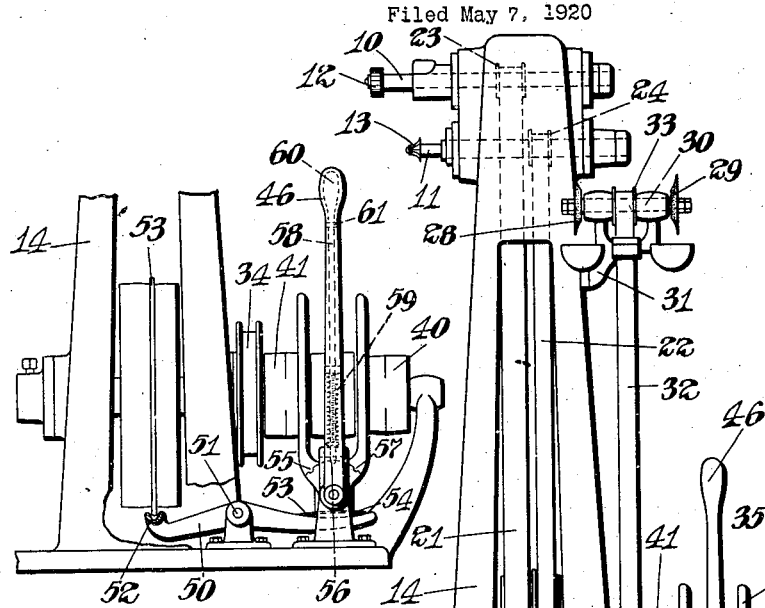

Aug. 30, 1927.

M. D. PHELAN 1,640,370

ROTARY TRANSMISSION MEANS

Filed May 7, 1920

INVENTOR
Martyn D. Phelan
By his Attorney
Nelson M. Howard

Patented Aug. 30, 1927.

1,640,370

UNITED STATES PATENT OFFICE.

MERTON D. PHELAN, OF LYNN, MASSACHUSETTS, ASSIGNOR TO UNITED SHOE MACHINERY CORPORATION, OF PATERSON, NEW JERSEY, A CORPORATION OF NEW JERSEY.

ROTARY TRANSMISSION MEANS.

Application filed May 7, 1920. Serial No. 379,522.

This invention relates to rotary transmission means and more especially to machines in which it is desired to couple independently rotatable tools, shafts, or other instrumentalities, selectively, to a source of rotation by shifting a power belt laterally. By way of example, for the purpose of disclosing one embodiment of the present invention, but without limiting the invention to any particular type of machine, the accompanying drawings represent a machine used in the manufacture of boots and shoes for trimming the edges of the soles. It is customary to provide, as regular equipment in such machines, a rotary grinder to be used from time to time, as occasion may require, to sharpen the cutters by which the soles are trimmed. The cutter-shaft or shafts (some machines having two) and the grinder-shaft are driven by separate belts arranged to be driven by one main belt common to all, and although, in practice, it is not necessary for the cutter-shaft to rotate when the grinder is being used, nor necessary for the grinder-shaft to rotate when the cutter is operating, such machines as heretofore organized have not had any provision for disconnecting the cutter-belt or the grinder-belt from the source of drive without unshipping one of the subordinate belts from its pulleys. In order, therefore, to avoid undue vibration, the risk of injury, and waste of power when using the trimmer or the grinder the operators have been under the necessity of taking off and putting on the grinder-belt and the cutter-belt from fifteen to twenty times a day. Furthermore, in some machines of the type illustrated the construction is such that it is impossible to remove the belt or belts by which the cutter-shaft or shafts (some machines having two cutter-shafts with a separate belt for each) are operated, and consequently the operator or other persons standing in the vicinity of the machine have, in many cases, been seriously injured by coming in contact with one of the rotating cutters during that period when the operator is giving his attention to the grinder.

In view of the conditions above pointed out an object of the invention is to provide improved rotary transmission means for a plurality of rotatable instrumentalities, whereby one of said instrumentalities may be driven while the other remains at rest, and vice versa, without putting the user under the necessity of unshipping a belt or otherwise disturbing the elements from their operative relation.

Another object of the invention is to provide improved transmission means by which a single main driving belt may be utilized to drive either one of two instrumentalities exclusively of the other or to run idly, as occasion may require. Since it is never necessary to drive the cutter-shaft or shafts while the grinder attachment is in use, nor to drive the grinder while the cutter or cutters are in use, it is desirable, from the viewpoint of safety and economy, to eliminate all the load and wear pertaining to the temporarily idle instrumentality and its transmission means when the other instrumentality is brought into play, and vice versa. Accordingly one object of the invention is to provide two relatively rotatable transmission units and means constructed and arranged to sustain them independently of each other but in such relation that a main driving belt will drive either one exclusively of the other in consequence of being shifted laterally. A feature of the invention consists in organizing two relatively rotatable transmission units so that one of them extends through the other, and in sustaining each of said units independently of the other so that neither will wear the other in consequence of being driven.

Other features of the invention are disclosed by the accompanying drawings and are hereinafter described and claimed.

Figure 3:
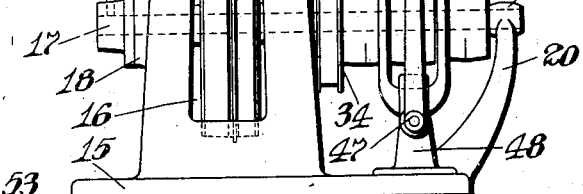
Figure 2:
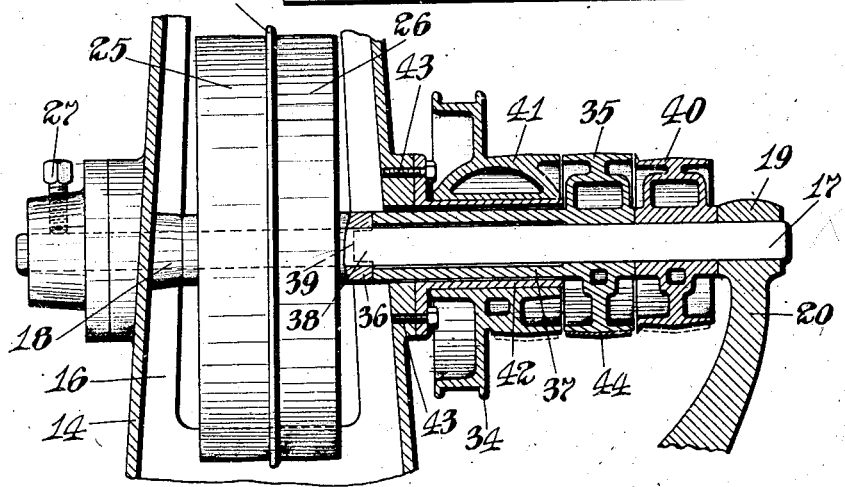

Referring to the drawings,

Fig. 1 represents a side elevation of a well-known type of edge-trimimng machine provided with one form of improved transmission means embodying features of the present invention;

Fig. 2 represents a vertical section through the transmission means and illustrates how two independently rotatable transmission units may be constructed and arranged to enable one of them to extend through the other; and Fig. 3 represents an elevation of the lower part of a machine similar to that shown in Fig. 1 but including brake mechanism constructed and arranged to be controlled by the belt-shifting means.

A machine of the type chosen for illustrating one adaptation of the present invention comprises two cutter-shafts 10 and 11, the first of which carries a cutter 12 having a profile suitable for trimming a shoe-sole around the forepart, while the other shaft is provided with a cutter 13 of another profile suitable for trimming the inner edge of the sole along the shank portion. These two shafts are mounted in the upper part of a standard 14 of hollow construction. The standard is provided with a base 15 and with openings 16 in opposite sides so that a pulley or pulleys of relatively large diameter may be inserted into the standard and protrude laterally therefrom through said openings. A shaft 17 is mounted in bearings 18 and 19 afforded by the frame of the machine, the first being formed in the standard 14 and the latter being provided by a bracket 20. The belts 21 and 22 are provided for driving the shafts 10 and 11 respectively, said shafts being provided with pulleys 23 and 24. The belts are driven by a pulley or pulleys on the shaft 17, a double pulley comprising sections 25 and 26 being shown in the present instance as a more economical and convenient construction than two separate pulleys would be. Heretofore it has been the practice to affix the pulleys 25 and 26 to the shaft that supports them, and to rotate said shaft, but according to the present invention this shaft may be and preferably is fixed against rotation. Accordingly the bearing 18 is provided with a set-screw 27 arranged to secure the shaft with respect to rotative movement as well as longitudinal movement.

In accordance with former well-known practice the machine is provided with an attachment for sharpening the cutters 12 and 13. The attachment shown for this purpose comprises grinding wheels 28 and 29 affixed to a shaft 30. This shaft is mounted in bearings afforded by a bracket 31, and the bracket is affixed to the standard 14 preferably at the rear of the latter and at one side. A grinder-belt 32 runs over a pulley 33 on the shaft 30 and is driven by a pulley 34 in line with the pulleys 25 and 26. According to the present invention the pulley 34, on the one hand, and the pulleys 25 and 26, on the other hand, are rotatable independently of each other, this fact being one point of difference between the present invention and machines as heretofore constructed for trimming the soles of shoes. With the other exception hereinbefore noted, namely, the fact that the shaft 17 is stationary, the construction thus far described is well-known.

In order to solve the problems hereinbefore outlined, and other problems not yet set forth, the invention provides improved transmission means comprising two independently rotatable transmission units one of which extends through the other, said units being organized in such relation as to receive rotation from a driving belt common to both and to transmit rotation to the cutters exclusively of the grinders or vice versa, as occasion may require. The transmission unit for the cutters comprises the double pulley 25, 26, a receiving pulley 35, and a sleeve connecting the double pulley and the receiving pulley. For reasons that will be explained in due course the connecting sleeve is made in two sections one of which is indicated at 36 and the other at 37. As shown the section 36 is structurally integral with the double pulley, being in fact an elongation of the hub of the pulley. In like manner the section 37 is structurally integral with the receiving pulley 35. These sections of the sleeve abut each other in end-to-end relation and are provided, one with a tongue or tongues 38 and the other with a notch or notches 39 to receive the tongues. In consequence of having these interengaged portions the sections of the sleeve are, to all intents and purposes, a structural unit so far as transmitting rotation is concerned, but the sections are nevertheless separable endwise to facilitate assembling. The separability of the sections makes it possible to arrange the double pulley 25, 26 in the standard 14 without breaking away that portion of the standard that stands between the double pulley and its receiving pulley.

The transmission unit heretofore identified is free to turn on the stationary shaft 17, the shaft serving not only as a support for the unit but serving also to maintain the sections 36 and 37 in coaxial relation to each other. When this unit is assembled in the frame of the machine the two sections of the sleeve are maintained in interlocked relation by the bearings 18 and 19 although, as shown, the hub of an idle belt-wheel 40 fills the space between the sleeve section 37 and the bearing 19. If for any reason it becomes necessary to remove the double pulley 25, 26 from the standard such removal may be easily accomplished without disturbing the assemblage otherwise than to loosen the set-screw 27 and move the shaft 17 toward the right until its left-hand end is beyond the right-hand end of the sleeve section 36. This would leave all the elements intact between the bearing 19 and the standard 14.

The other transmission unit comprises the grinder-pulley 34 and a receiving pulley 41. These two pulleys as shown are structurally integral. Pulleys 40, 35 and 41 are arranged in a series so that a main driving belt 44 may be shifted to and run on any one of them.

The transmission unit for the grinder is sustained independently of and out of contact with the unit for the sole-trimming mechanism. As shown, the pulleys 34 and 41 are mounted on a stationary sleeve 42, the latter surrounding the sleeve section 37 and being affixed to the standard 14 by bolts 43. Preferably, and as shown, the internal diameter of the stationary sleeve is greater than the external diameter of the rotary sleeve in order to avoid friction between the two sleeves. Consequently when either transmission unit is in use it is free from wear and retarding effect of the other. Furthermore such clearance dispenses with the necessity for having the stationary sleeve precisely in caoxial relation to the rotary sleeve, thereby allowing a considerable margin for error in the location of the bolt holes without ill consequence.

So far as the principles of the invention are concerned it would not matter whether the loose pulley 40 were interposed between the pulleys 35 and 41 or whether the pulley 35 were interposed between the pulleys 40 and 41 as shown, although the illustrated arrangement would be preferable for some reasons since it permits a shorter length of the rotary sleeve and enables the idle pulley to bear directly on the shaft 17. If, after long usage, the shaft becomes excessively worn on one side by the rotary sleeve or by the loose pulley it may be turned to another position where portions not so badly worn will be brought into play to support the sleeve and the loose pulley.

In Fig. 2 a main driving belt is indicated at 44 and is shown in its median position where it runs on pulley 35. Fig. 1 includes a shipper 45 and a handle 46 for moving it from side to side. The shipper and the handle are affixed to a rock shaft 47 and the latter is mounted in brackets one of which is indicated at 48.

If it is desired to arrest the rotation of the cutter shafts promptly when the main driving belt is shifted from the pulley 35, a brake mechanism such as that shown by Fig. 3 may be provided. This mechanism is arranged to be controlled by the belt-shipper so that whenever the latter is moved in either direction from its median position it will apply the brake to the double pulley 25, 26. A brake-lever 50 mounted upon a fulcrum pin 51 is provided with a brake-shoe 52, and the latter is arranged to act on a flange 53 by which the two sections of the double pulley are separated one from the other. Accordingly the brake-shoe is provided with a tapering groove to receive the flange. The brake-lever extends under the hub of the shipper 45, and the latter is provided with a double leaf-spring, the extremities 53 and 54 of which are arranged to bear on the brake-lever excepting when the shipper is in its median position. When the shipper is moved to transfer the main driving belt to the pulley 41 it tilts the double leafspring so that the extremity 53 bears downwardly on the brake-lever, thus forcing the brake-shoe into engagement with the flange 53, but when the shipper is moved to transfer the belt to the idle pulley 40 the extremity 54 of the leaf-spring moves downwardly so as to apply the brake. A locking sector is provided with three notches 55, 56 and 57 corresponding to the three positions of the shipper, and the handle 46 is provided with a movable locking rod 58 the lower end of which is arranged to drop into any one of the notches. A compression spring 59 is arranged to force the rod downwardly and a finger-piece 60 is provided for withdrawing the rod from the notches. The finger-piece is of well-known construction for such purposes, embodying a bell-crank formation and being mounted on a pivot pin 61. When the shipper is locked in either of its two extreme positions the brake-shoe is maintained in braking position so that even though the belt might overlap the pulley 35 slightly the brake would prevent the inner transmission unit from rotating. This feature safeguards bystanders from the risk of being injured by the cutters so long as the main driving belt is running on the idle pulley or on the pulley 41.

Having thus described my invention, what I claim as new and desire to secure by Letters Patent of the United States is:

1. Transmission mechanism comprising a shaft, two supports spaced a fixed distance apart in which said shaft is arranged, two relatively rotatable transmission units surrounding said shaft between said supports, one of said units extending through the other and having transmission wheels between which said other is arranged, and the inner unit having separable interlocked sections maintained in interlocked relation by said supports.

2. In combination, an annular transmission unit and a sectional transmission unit each rotatable independetly of the other, the sectional unit extending through said annular unit and including two sections having interengaged coupling portions one of which is adapted to pass through said annular unit, and means for supporting said units.

3. Two relatively rotatable transmission units one of which extends through the other and comprises two sections having interengaged coupling portions, means arranged to support the outer one of said units, the coupling portion of one of said sections being adapted to pass through said supporting means and the outer unit, and means arranged to support the unit comprising said sections.

4. In combination, two separate supporting fixtures, a non-rotary shaft supported by said fixtures and affixed to one of them, two independently rotatable transmission units and an idle pulley surrounding said shaft between said supporting fixtures, one of said units having a sleeve supported by and arranged to bear on said shaft, and a tubular fixture surrounding but not touching said sleeve and supporting the other one of said units, said units having transmission pulleys arranged adjacent to said idle pulley so that a laterally shiftable belt may run from one to another of said pulleys.

In testimony whereof I have signed my name to this specification.

MERTON D. PHELAN.